United States Patent
Hasu et al.

(10) Patent No.: US 9,894,334 B2
(45) Date of Patent: Feb. 13, 2018

(54) SIGNAL PROCESSING CIRCUIT, CIRCUIT SUBSTRATE, AND PROJECTOR

(71) Applicant: SEIKO EPSON CORPORATION, Tokyo (JP)

(72) Inventors: Tatsuhiro Hasu, Matsumoto (JP); Takekuni Yamamoto, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/031,541

(22) PCT Filed: Nov. 6, 2014

(86) PCT No.: PCT/JP2014/005591
§ 371 (c)(1),
(2) Date: Apr. 22, 2016

(87) PCT Pub. No.: WO2015/068396
PCT Pub. Date: May 14, 2015

(65) Prior Publication Data
US 2016/0269699 A1    Sep. 15, 2016

(30) Foreign Application Priority Data
Nov. 11, 2013    (JP) .................. 2013-232789

(51) Int. Cl.
*H04N 9/31*    (2006.01)
*H04N 5/268*    (2006.01)
(Continued)

(52) U.S. Cl.
CPC .......... *H04N 9/3179* (2013.01); *G09G 3/20* (2013.01); *G09G 3/36* (2013.01); *G09G 5/00* (2013.01); *G09G 5/02* (2013.01)

(58) Field of Classification Search
CPC .......... H04N 9/3179; G09G 5/02; G09G 3/20
(Continued)

(56) References Cited

U.S. PATENT DOCUMENTS 7,170,522 B2 *    1/2007    Yamaura .................. G06T 1/60
345/506
2003/0222860 A1    12/2003    Yamaura
(Continued)

FOREIGN PATENT DOCUMENTS

JP    2003-256826 A    9/2003
JP    2005-227401 A    8/2005
(Continued)

OTHER PUBLICATIONS

Feb. 10, 2015 Search Report issued in International Patent Application No. PCT/JP2014/005591.

*Primary Examiner* — Michael Lee
*Assistant Examiner* — Jean W Desir
(74) *Attorney, Agent, or Firm* — Oliff PLC (57) ABSTRACT

An image processing circuit includes a front stage signal processing circuit that performs processing of input data and outputs the data and a rear stage signal processing circuit that performs processing which is to be performed on the data obtained after processing of the input data performed by the front stage signal processing circuit and outputs the data. The image processing circuit is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data,
(Continued)

and a third state that performs processing of the input data using the rear stage signal processing circuit and outputs the data.

18 Claims, 4 Drawing Sheets

(51) Int. Cl.
*G09G 3/20* (2006.01)
*G09G 3/36* (2006.01)
*G09G 5/00* (2006.01)
*G09G 5/02* (2006.01)

(58) Field of Classification Search
USPC ....... 348/744, 553, 554, 571, 575, 758, 759, 348/705, 557
See application file for complete search history.

(56) References Cited

U.S. PATENT DOCUMENTS

| | | |
|---|---|---|
| 2005/0190124 A1 | 9/2005 | Manabe |
| 2015/0002551 A1* | 1/2015 | Nagano .................... G06T 3/40 345/667 |

FOREIGN PATENT DOCUMENTS

| | | |
|---|---|---|
| JP | 2006-072231 A | 3/2006 |
| JP | 2008-172594 A | 7/2008 |
| JP | 2009-274253 A | 11/2009 |

* cited by examiner

SIGNAL PROCESSING CIRCUIT, CIRCUIT SUBSTRATE, AND PROJECTOR

CROSS REFERENCE TO RELATED APPLICATIONS

The entire disclosure of Japanese Patent Application No. 2013-232789, filed Nov. 11, 2013 is expressly incorporated by reference herein.

BACKGROUND

1. Technical Field

The present invention relates to a signal processing circuit in which a circuit performing signal processing is disposed, a circuit substrate on which the signal processing circuit can be mounted, and a projector that includes the circuit substrate.

2. Related Art

In the related art, there is known a projection-type display apparatus that includes liquid crystal panels modulating light of red color (R), green color (G), and blue color (B) and combines and projects the light modulated by the liquid crystal panels (for example, refer to JP-A-2006-72231). This type of projection-type display apparatus includes a processing system configured to include a signal processing circuit, performs image processing of an input color video signal (color video data) using the signal processing circuit, and drives the liquid crystal panels on the basis of a processing result.

In an apparatus, such as the above projection-type display apparatus, that includes the processing system configured to include the signal processing circuit, the processing system is required to have a different processing capability according to the model and the type of the apparatus. For the above projection-type display apparatus as an example, the processing system is required to have a different processing capability in a case of a higher model in which the resolution of the liquid crystal panels is high and in a case of a lower model in which the resolution is low. From this point of view, there is a need for capability to build a processing system that meets a required processing capability along with reducing cost to the extent possible.

The invention is conceived in view of the above circumstances, and an object thereof is provision of capability to build a processing system that meets a required processing capability along with reducing cost.

SUMMARY

In order to achieve the above object, the invention is characterized by a signal processing circuit including a front stage signal processing circuit that performs processing of input data and outputs the data, and a rear stage signal processing circuit that performs processing which is to be performed on the data obtained after processing of the input data performed by the front stage signal processing circuit and outputs the data, in which the signal processing circuit is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data, and a third state that performs processing of the input data using the rear stage signal processing circuit and outputs the data.

According to this configuration, for a processing system that is required to have a low processing capability, the required processing capability can be met by disposing one signal processing circuit and switching a state of the one signal processing circuit to the first state. For a processing system that is required to have a high processing capability, the required processing capability can be met by disposing the signal processing circuit for the second state in a front stage and disposing the signal processing circuit for the third state in a rear stage to perform distributed processing using the plurality of signal processing circuits. In either case, both of the processing performed by the front stage signal processing circuit and the processing performed by the rear stage signal processing circuit are performed. The configuration of each signal processing circuit is the same in a case of using the signal processing circuit as a single body in the processing system and in a case of using the plurality of signal processing circuits in the processing system. Thus, in building of the processing system, it is not necessary to use a signal processing circuit having a different processing capability, that is, a different configuration, according to a required processing capability, and cost can be reduced.

The invention is characterized in that the front stage signal processing circuit and the rear stage signal processing circuit are connected to a memory, the data output by the front stage signal processing circuit is temporarily stored in the memory, and the data that is temporarily stored in the memory is input into the rear stage signal processing circuit.

According to this configuration, it is possible to choose whether to build a processing system using the signal processing circuit as a single body or to build a processing system using the signal processing circuit in plural quantities on the basis of a relationship between a required processing capability and a capability of the memory such as a bandwidth of the memory.

The invention is characterized in that the front stage signal processing circuit performs processing that uses information as to a plurality of colors on the basis of input color video data and outputs video data for each color, the rear stage signal processing circuit is disposed in plural quantities for each color, and each of the rear stage signal processing circuits disposed for each color receives input of the video data for each color and performs processing on the basis of the input video data of corresponding colors in the first state.

According to this configuration, for an apparatus that performs processing based on the input color video signal, a processing system can be built by using one signal processing circuit in a case where a low processing capability is required, or a processing system can be built by using the signal processing in plural quantities in a case where a high processing capability is required. That is, it is possible to build a processing system that meets a required processing capability along with reducing cost.

The invention is characterized in that a plurality of the rear stage signal processing circuits performs processing based on the video data of one color in cooperation with each other in the third state.

According to this configuration, the plurality of the rear stage signal processing circuits can perform processing based on the video data of one color with a higher processing capability in the third state than in a case where a single body rear stage signal processing circuit performs processing.

The invention is characterized by further including another rear stage signal processing circuit in addition to the rear stage signal processing circuits for each color, in which each of the rear stage signal processing circuits disposed for each color performs processing on the basis of the input video data of corresponding colors, while the other signal processing circuit does not perform processing, in the first state, and a plurality of the rear stage signal processing circuits including the other rear stage signal processing circuit performs processing based on the video data of one color in cooperation with each other in the third state.

According to this configuration, processing based on the video data of one color can be performed with a high processing capability by using the other rear stage signal processing circuit in the third state.

In order to achieve the above object, the invention is characterized by a circuit substrate on which mounted is a signal processing circuit in which a front stage signal processing circuit that performs processing of input data and outputs the data and a rear stage signal processing circuit that performs processing which is to be performed on the data obtained after processing of the input data performed by the front stage signal processing circuit and outputs the data are disposed, and that is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data, and a third state that performs processing of the input data using the rear stage signal processing circuit and outputs the data, in which in a case where the signal processing circuit is mounted as a single body, a state of the signal processing circuit mounted is switched to the first state, and in a case where a plurality of the signal processing circuits is mounted in combination, a state of the signal processing circuit mounted on a front stage is switched to the second state and a state of the signal processing circuit mounted on a rear stage is switched to the third state.

According to this configuration, in a case where a low processing capability is required, the required processing capability can be met by mounting one signal processing circuit on the circuit substrate related to the processing system and switching a state of the one signal processing circuit to the first state. In a case where a high processing capability is required, the required processing capability can be met by mounting the signal processing circuit for the second state on the front stage and mounting the signal processing circuit for the third state on the rear stage to perform distributed processing using the plurality of signal processing circuits. In either case, both of the processing performed by the front stage signal processing circuit and the processing performed by the rear stage signal processing circuit are performed. The configuration of each signal processing circuit is the same in a case of using the signal processing circuit as a single body in the processing system and in a case of using the plurality of signal processing circuits in the processing system. Thus, in building of the processing system, it is not necessary to use a signal processing circuit having a different processing capability, that is, a different configuration, according to a required processing capability, and cost can be reduced.

The invention is characterized in that the front stage signal processing circuit and the rear stage signal processing circuit of the signal processing circuit are connected to a memory, the data output by the front stage signal processing circuit is temporarily stored in the memory, and the data that is temporarily stored in the memory is input into the rear stage signal processing circuit.

According to this configuration, it is possible to choose whether to build a processing system by mounting the signal processing circuit as a single body on the circuit substrate or to build a processing system by mounting the signal processing circuit in plural quantities on the circuit substrate on the basis of a relationship between a required processing capability and a capability of the memory such as a bandwidth of the memory.

The invention is characterized in that the front stage signal processing circuit of the signal processing circuit performs processing that uses information as to a plurality of colors on the basis of input color video data and outputs video data for each color, the rear stage signal processing circuit of the signal processing circuit is disposed in plural quantities for each color, and in a case where the signal processing circuit is mounted as a single body and the state of the signal processing circuit mounted is switched to the first state, each of the rear stage signal processing circuits of the signal processing circuit disposed for each color receives input of the video data for each color and performs processing on the basis of the input video data of corresponding colors.

According to this configuration, for the apparatus that performs processing based on the input color video signal, a processing system can be built by mounting the signal processing circuit as a single body on the circuit substrate in a case where a low processing capability is required, or a processing system can be built by mounting the signal processing in plural quantities on the circuit substrate in a case where a high processing capability is required. That is, it is possible to build a processing system that meets a processing capability along with reducing cost.

The invention is characterized in that in a case where a plurality of the signal processing circuits is mounted in combination, a plurality of the signal processing circuits is mounted for each color on the rear stage, the state of the signal processing circuit mounted on the front stage is switched to the second state, and the state of each of the signal processing circuits mounted on the rear stage is switched to the third state, the signal processing circuit in the front stage according to the second state outputs the video data for each color to the corresponding signal processing circuits in the rear stage on the basis of the input color video data, and in each of the signal processing circuits in the rear stage according to the third state, a plurality of the rear stage signal processing circuits performs processing based on the input video data of one color in cooperation with each other.

According to this configuration, in the signal processing circuits according to the third state, the plurality of the rear stage signal processing circuits can perform processing based on the video data of one color with a higher processing capability than in a case where a single body rear stage signal processing circuit performs processing.

The invention is characterized in that the signal processing circuit includes another rear stage signal processing circuit in addition to the rear stage signal processing circuits for each color, in which each of the rear stage signal processing circuits disposed for each color performs processing on the basis of the input video data of corresponding colors, while the other signal processing circuit does not perform processing, in the first state, and a plurality of the rear stage signal processing circuits including the other rear stage signal processing circuit performs processing based on the video data of one color in cooperation with each other in the third state.

According to this configuration, processing based on the video data of one color can be performed with a high processing capability by using the other rear stage signal processing circuit in the third state.

In order to achieve the above object, the invention is characterized by a projector including light modulation units for each color, a projection unit that projects light modulated by the light modulation units for each color, and a circuit substrate on which mounted is a signal processing circuit in which a front stage signal processing circuit that performs processing which uses information as to a plurality of colors on the basis of input color video data and outputs video data for each color is disposed and a rear stage signal processing circuit that performs processing on the basis of input video data of a corresponding color is disposed in plural quantities for each color, and that is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data, and a third state that performs processing of the input data using the rear stage signal processing circuit and outputs the data, in which in a case where the signal processing circuit is mounted as a single body, a state of the signal processing circuit mounted is switched to the first state, and in a case where a plurality of the signal processing circuits is mounted in combination, a state of the signal processing circuit mounted on a front stage is switched to the second state and a state of the signal processing circuit mounted on a rear stage is switched to the third state.

According to this configuration, in a case where a low processing capability is required, the required processing capability can be met by mounting one signal processing circuit on the circuit substrate related to the processing system in the projector and switching a state of the one signal processing circuit to the first state. In a case where a high processing capability is required, the required processing capability can be met by mounting the signal processing circuit for the second state on the front stage and mounting the signal processing circuit for the third state on the rear stage to perform distributed processing using the plurality of signal processing circuits. In either case, both of the processing performed by the front stage signal processing circuit and the processing performed by the rear stage signal processing circuit are performed. The configuration of each signal processing circuit is the same in a case of using the signal processing circuit as a single body in the processing system and in a case of using the plurality of signal processing circuits in the processing system. Thus, in building of the processing system, it is not necessary to use a signal processing circuit having a different processing capability, that is, a different configuration, according to a required processing capability, and cost can be reduced.

Advantageous Effects of Invention

According to the invention, it is possible to build a processing system that meets a required processing capability along with reducing cost.

DESCRIPTION OF EMBODIMENTS

Hereinafter, an embodiment of the invention will be described with reference to the drawings.

Figure 1:
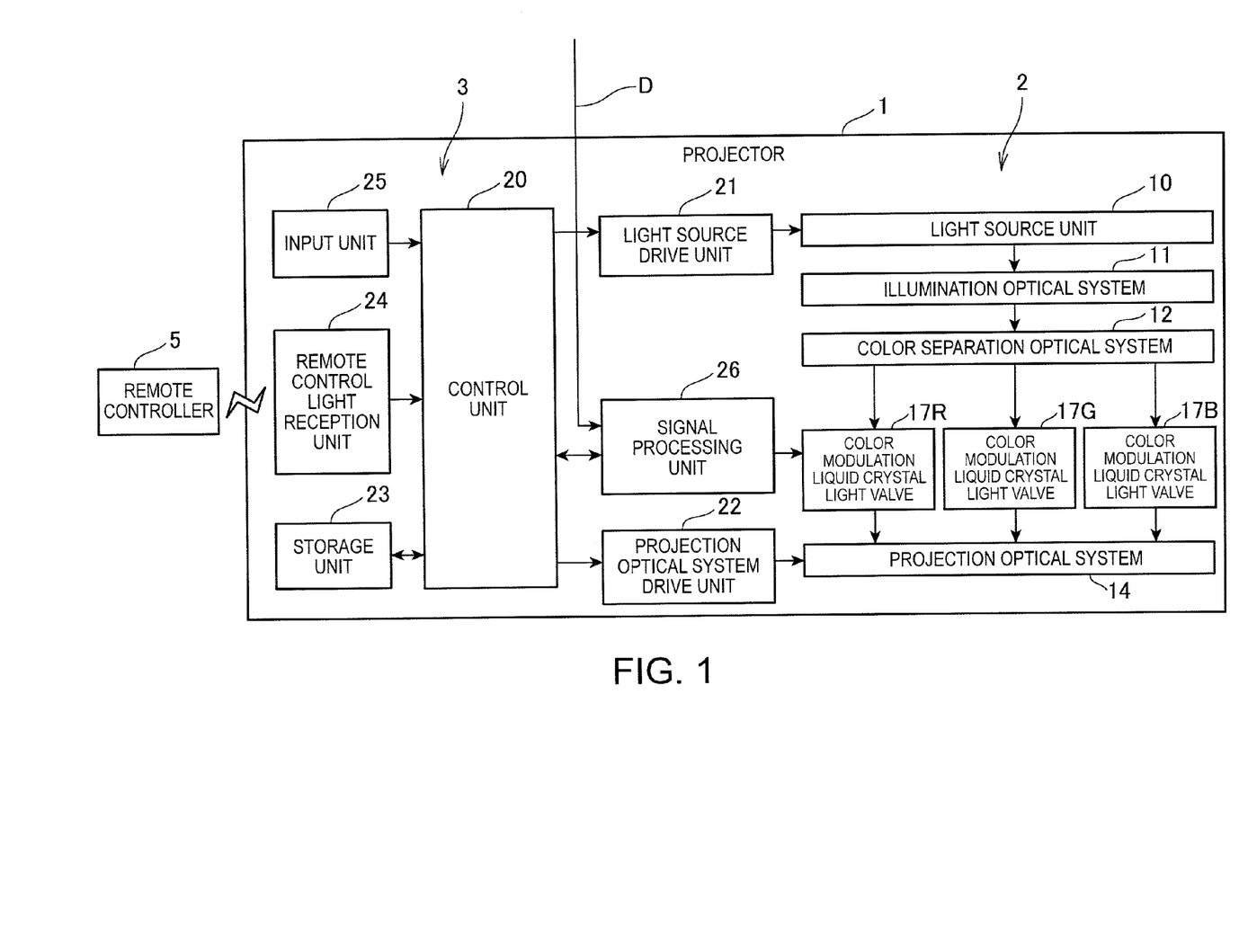
FIG. 1 is a diagram illustrating a configuration of a projector according to the present embodiment.

FIG. 1 is a block diagram illustrating an entire configuration of a projector 1 as a display apparatus according to the present embodiment.

The projector 1 is an apparatus that is connected to an external image supply apparatus (not illustrated), such as a personal computer and various types of video players, and displays an image based on a color video signal D (data or color video data) input from the image supply apparatus by projecting the image on a display surface such as a screen SC. Examples of the image supply apparatus include a video output apparatus such as a video reproduction apparatus, a DVD reproduction apparatus, a television tuner apparatus, a CATV set-top box, and a video game apparatus; a personal computer; and the like. The projector 1 can display either a still image or a moving image.

The projector 1 is broadly configured of a display system 2 that performs formation of an optical image and an image processing system 3 that processes an image displayed by the display system 2.

The display system 2 includes a light source unit 10, an illumination optical system 11, a color separation optical system 12, a modulation unit 13, and a projection optical system 14.

The light source unit 10 includes a light source having a xenon lamp, an extra-high-pressure mercury lamp, an LED, or the like and outputs light emitted by the light source to the illumination optical system 11. The light source unit 10 may include a reflector and an auxiliary reflector that guide light emitted by the light source to the illumination optical system 11 or may include a lens group (not illustrated) for improving optical characteristics of projected light, a polarization plate, a dimming element that reduces the intensity of light emitted by the light source on a path leading to the illumination optical system 11, or the like.

The illumination optical system 11 collimates light emitted by the light source unit 10, renders the illuminance of the light uniform, aligns the polarization direction of the light to one direction, and outputs the light to the color separation optical system 12.

The color separation optical system 12 includes a reflecting mirror and a dichroic mirror, separates light input from the illumination optical system 11 into light of three colors of red color (R), green color (G), and blue color (B), and outputs the separated light to liquid crystal light valves 17R, 17G, and 17B in the modulation unit 13.

The modulation unit 13 includes the three liquid crystal light valves 17R, 17G, and 17B (each corresponds to "light modulation unit") in correspondence with red color (R), green color (G), and blue color (B).

The liquid crystal light valves 17R, 17G, and 17B are liquid crystal light valves in each of which a plurality of pixels, the transmittances of which are individually controllable, is arranged in a matrix form. The liquid crystal light valves 17R, 17G, and 17B modulate input light by changing the transmittance of light in each pixel arranged in a matrix form and outputs the modulated light. Each pixel of the liquid crystal light valves 17R, 17G, and 17B is controlled on the basis of an image to be projected on the screen SC, and the transmittance thereof is changed. As a result, light that is transmitted by each liquid crystal light valve is modulated in accordance with the image to be projected. Light that is modulated by the liquid crystal light valves 17R, 17G, and 17B is combined by a cross dichroic prism, not illustrated, and the combined light is output to the projection optical system 14.

The projection optical system 14 includes a zoom lens that enlarges or shrinks the projected image and adjusts a focal point, a zoom adjusting motor that adjusts the degree of zooming, a focus adjusting motor that adjusts the focus, and the like. The projection optical system 14 projects and images light modulated by the modulation unit 13 on the screen SC using the zoom lens.

In the present embodiment, the light source unit 10, the illumination optical system 11, the color separation optical system 12, the modulation unit 13, and the projection optical system 14 cooperatively function as "projection unit".

The image processing system 3 includes a control unit 20, a light source drive unit 21, a projection optical system drive unit 22, a storage unit 23, a remote control light reception unit 24, an input unit 25, and a signal processing unit 26 (processing system).

The control unit 20 includes a CPU, a ROM, a RAM, other peripheral circuits, and the like and controls each unit of the projector 1.

The light source drive unit 21 includes a drive circuit and the like related to driving of the light source unit 10 and drives the light source unit 10 under control of the control unit 20.

The projection optical system drive unit 22 includes a drive circuit and the like related to driving of the projection optical system 14 and drives the projection optical system 14 under control of the control unit 20.

The storage unit 23 includes a non-volatile memory such as an EEPROM and is rewritable to store various types of data. The storage unit 23 stores a control program that is related to controlling of the projector 1.

The remote control light reception unit 24 decodes an infrared signal received from a remote controller 5 and outputs the decoded signal to the control unit 20. The control unit 20 detects the content of an operation performed on the remote controller 5 on the basis of input from the remote control light reception unit 24.

The input unit 25 is connected to an operating unit such as various types of switches and a touch panel disposed in the projector 1, detects an operation performed on the operating unit, and outputs the operation to the control unit 20. The control unit 20 detects the content of the operation performed on the operating unit on the basis of input from the input unit 25.

The signal processing unit 26 (processing system) drives the liquid crystal light valves 17R, 17G, and 17B on the basis of the input color video signal D under control of the control unit 20 as described later.

The projector 1 according to the present embodiment exists in two models, a lower model in which the liquid crystal light valves 17R, 17G, and 17B are configured of low-resolution liquid crystal panels and a higher model in which the liquid crystal light valves 17R, 17G, and 17B are configured of high-resolution liquid crystal panels. The signal processing unit 26 according to the higher model is required to have a higher processing capability than the signal processing unit 26 according to the lower model. In the present embodiment, each of the signal processing unit 26 according to the lower model and the signal processing unit 26 according to the higher model has a configuration described below, thereby meeting a required processing capability along with reducing cost.

Hereinafter, the signal processing unit 26 according to the lower model will be first described, and next, the signal processing unit 26 according to the higher model will be described.

Description of Signal Processing Unit 26 According to Lower Model

Hereinafter, first, the signal processing unit 26 according to the lower model will be described.

Figure 2:
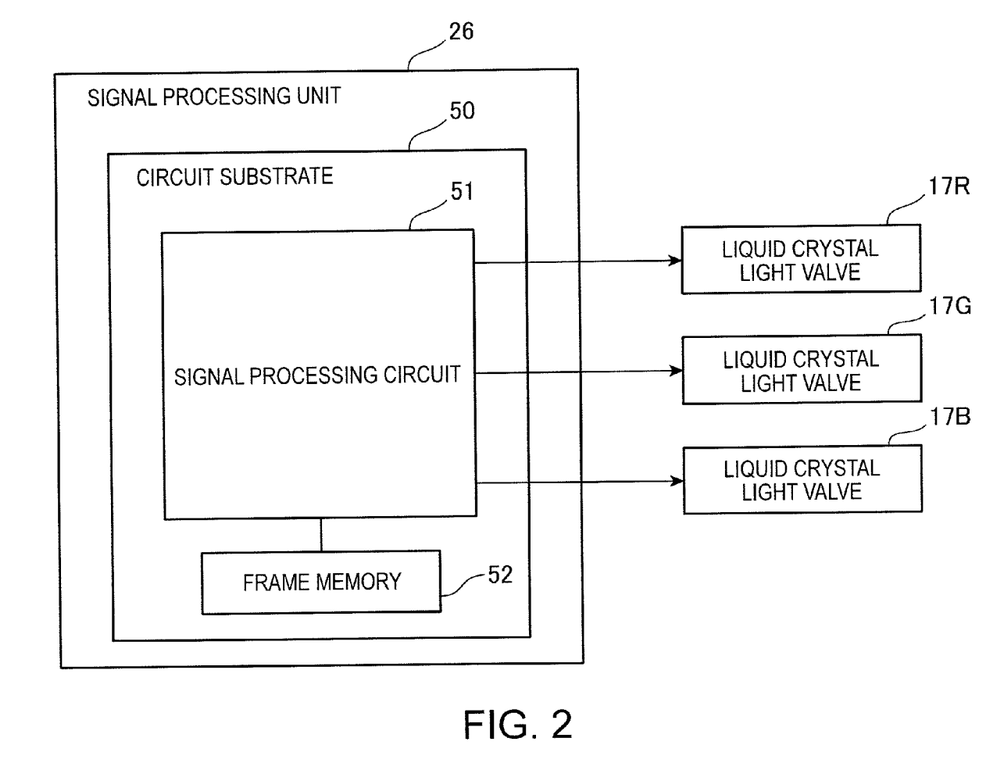
FIG. 2 is a diagram illustrating a configuration of a signal processing unit according to a lower model.

FIG. 2 is a diagram illustrating a configuration of the signal processing unit 26 according to the lower model.

As illustrated in FIG. 2, the signal processing unit 26 includes a circuit substrate 50, and on the circuit substrate 50, mounted are a signal processing circuit 51 and a frame memory 52 that is configured to include an SDRAM. As apparent later, the signal processing circuit 51 outputs a drive signal to the liquid crystal light valves 17R, 17G, and 17B using the input color video signal D to drive these liquid crystal light valves.

The circuit substrate 50 may be in common with or separate from a circuit on which each circuit related to the control unit 20 is mounted.

Figure 3:
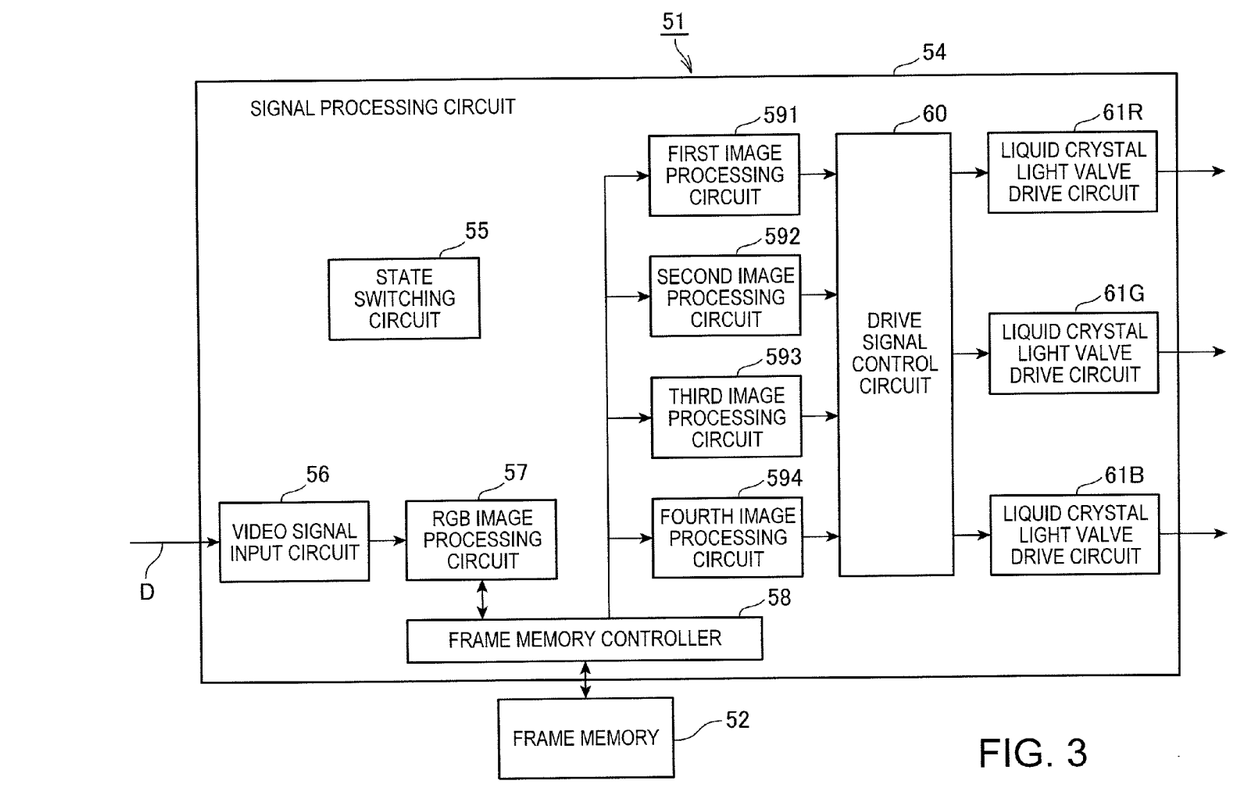
FIG. 3 is a diagram illustrating a configuration of a signal processing circuit.

FIG. 3 is a diagram illustrating a configuration of the signal processing circuit 51.

As illustrated in FIG. 3, the signal processing circuit 51 includes a circuit main body 54 on which a state switching circuit 55, a video signal input circuit 56, an RGB image processing circuit 57, a frame memory controller 58, a first image processing circuit 591, a second image processing circuit 592, a third image processing circuit 593, a fourth image processing circuit 594, a drive signal control circuit 60, and liquid crystal light valve drive circuits 61R, 61G, and 61B are mounted.

Of the circuits included in the signal processing circuit 51, the video signal input circuit 56 and the RGB image processing circuit 57 correspond to "front stage processing circuit", and the first image processing circuit 591, the second image processing circuit 592, the third image processing circuit 593, and the fourth image processing circuit 594 correspond to "rear stage processing circuit".

The state switching circuit 55 switches the operating mode (state) of the signal processing unit 26 to one of a first operating mode (first state), a second operating mode (second state), and a third operating mode (third state) which are described in detail later.

Specifically, a DIP switch, not illustrated, for providing an instruction to switch the operating mode of the signal processing circuit 51 to one of the three operating modes is disposed in the signal processing circuit 51. In addition, a different signal is configured to be input into the state switching circuit 55 according to the state of the DIP switch. If a signal related to the first operating mode is input, the state switching circuit 55 outputs a signal indicating that the operating mode is the first operating mode to corresponding ports of each circuit constituting the signal processing circuit 51. Each circuit detects the operating mode being the first operating mode on the basis of input from the state switching circuit 55 and subsequently performs processing in compliance with the first operating mode. The same applies to a case where an instruction to switch to the second operating mode or to the third operating mode is provided.

The operating mode of the signal processing unit 26 according to the lower model, that is, the signal processing unit 26 in which one signal processing circuit 51 is mounted on the circuit substrate 50, is switched to the first operating mode in advance, and each circuit constituting the signal processing circuit 51 performs processing in compliance with the first operating mode.

Hereinafter, processing of each circuit constituting the signal processing circuit 51 will be described in a case where the operating mode is the first operating mode.

Description of Processing of Each Circuit of Signal Processing Circuit 51 According to First Operating Mode The color video signal D is input into the video signal input circuit 56. The color video signal D is input in synchronization with a horizontal synchronization signal and a vertical synchronization signal, and the video signal input circuit 56 obtains frame image data P that is image data corresponding to one frame on the basis of the vertical synchronization signal. The frame image data P is data configured of a dot and retains color components of red color (R), green color (G), and blue color (B) as tone values of predetermined tones (for example, 256 tones) for each dot. Next, the video signal input circuit 56 outputs the obtained frame image data P as a signal to the RGB image processing circuit 57. The processing described heretofore is continuously performed for each frame.

The RGB image processing circuit 57 performs a predetermined type of processing on the input frame image data P and generates red color frame image data Pr that is red color component image data corresponding to one frame, green color frame image data Pg that is green component image data corresponding to one frame, and blue color frame image data Pb that is blue color component image data corresponding to one frame.

Processing performed by the RGB image processing circuit 57 includes, for example, color space conversion processing, scaling processing, noise reduction processing, super-resolution processing, intermediate frame generation processing in a case where the input color video signal D is a signal related to a moving image, and processing related to trapezoidal correction in a case where the RGB image processing circuit 57 has a trapezoidal correction function. In a case of implementing a function that projects an image related to a three-dimensional space, the RGB image processing circuit performs processing of generating image data that corresponds to a three-dimensional space. As such, processing performed by the RGB image processing circuit 57 includes types of processing, such as the color space conversion processing, that use the RGB value of each dot constituting the frame image data P (types of processing that use information as to a plurality of colors).

The RGB image processing circuit 57 outputs the generated red color frame image data Pr to the first image processing circuit 591, outputs the green color frame image data Pg to the second image processing circuit 592, and outputs the blue color frame image data Pb to the third image processing circuit 593 through the frame memory controller 58.

The frame memory 52 is a storage device that is configured to include a memory such as an SDRAM, and a buffer (temporary storage region) is formed therein. The frame memory controller 58 performs input and output of data in a predetermined storage region of the frame memory 52.

The RGB image processing circuit 57, upon performing the above various types of processing, uses the frame memory 52 as a work area and temporarily stores various types of data used in processing in the frame memory 52. In particular, the frame image data P that is a processing target or the red color frame image data Pr, the green color frame image data Pg, and the blue color frame image data Pb generated are loaded into a predetermined storage region of the frame memory 52.

In the first operating mode, the first image processing circuit 591 performs a predetermined type of processing on the input red color frame image data Pr and outputs a drive signal related to driving of the liquid crystal light valve drive circuit 61R, a drive circuit for the liquid crystal light valve 17R, to the drive signal control circuit 60.

Processing performed by the first image processing circuit 591 includes types of processing that are based on characteristics and individual differences in the liquid crystal light valve 17R, such as correction of a pixel shift between the liquid crystal light valve 17R and the other liquid crystal light valves (for example, correction related to so-called registration adjustment). The first image processing circuit 591 generates a drive signal on the basis of the red color frame image data Pr on which various types of image processing are performed and outputs the drive signal to the drive signal control circuit 60. The first image processing circuit 591, upon performing various types of processing, uses the frame memory 52 as a work area and temporarily stores various types of data used in processing in the frame memory 52. Particularly, the red color frame image data Pr that is a processing target is loaded into a predetermined storage region of the frame memory 52.

Similarly, the second image processing circuit 592 generates a drive signal on the basis of the input green color frame image data Pg and outputs the drive signal to the drive signal control circuit 60. The third image processing circuit 593 generates a drive signal on the basis of the input blue color frame image data Pb and outputs the drive signal to the drive signal control circuit 60.

As such, in the first operating mode, the first image processing circuit 591, the second image processing circuit 592, and the third image processing circuit 593 share one frame memory 52 at the same time during processing.

In a case where the operating mode is the first operating mode, the fourth image processing circuit 594 does not perform processing.

The drive signal control circuit 60 outputs the drive signal input from the first image processing circuit 591 to the liquid crystal light valve drive circuit 61R. The liquid crystal light valve drive circuit 61R is configured to include a D/A conversion circuit and a driver circuit IC, applies a drive voltage to the liquid crystal light valve 17R on the basis of the input drive signal to drive the liquid crystal light valve, and changes the transmittance of light in each pixel arranged in a matrix form. As a result, light that is transmitted by the liquid crystal light valve 17R is modulated in accordance with the image to be projected.

Similarly, the drive signal control circuit 60 outputs the drive signal input from the second image processing circuit 592 to the liquid crystal light valve drive circuit 61G, and the liquid crystal light valve drive circuit 61G drives the liquid crystal light valve 17G. In addition, the drive signal control circuit 60 outputs the drive signal input from the third image processing circuit 593 to the liquid crystal light valve drive circuit 61B, and the liquid crystal light valve drive circuit 61B drives the liquid crystal light valve 17B.

As described heretofore, the signal processing unit 26 according to the lower model has a configuration in which the signal processing circuit 51 that operates in compliance with the first operating mode is mounted as a single body on the circuit substrate 50 of the signal processing unit 26.

In a case where the operating mode is the first operating mode, the frame memory 52 is used as a work area for the first image processing circuit 591, the second image processing circuit 592, and the third image processing circuit 593 at the same time by these circuits. In addition, in the present embodiment, the frame memory 52 has a sufficient capability (band, storage capacity, and the like) for functioning as a work area for the three circuits when the three circuits perform various types of processing according to the lower model.

Furthermore, the video signal input circuit 56 and the RGB image processing circuit 57 (front stage processing circuit) and the first image processing circuit 591, the second image processing circuit 592, and the third image processing circuit 593 (rear stage processing circuit) have sufficient processing capabilities for performing various types of processing according to the lower model.

Thus, the signal processing unit 26 according to the lower model, by functioning of the single body signal processing circuit 51, can project an image on the screen SC without generating image disturbance and the like due to delays in processing of various types of circuits.

Description of Signal Processing Unit 26 According to Higher Model

Next, first, the signal processing unit 26 according to the higher model will be described.

Figure 4:
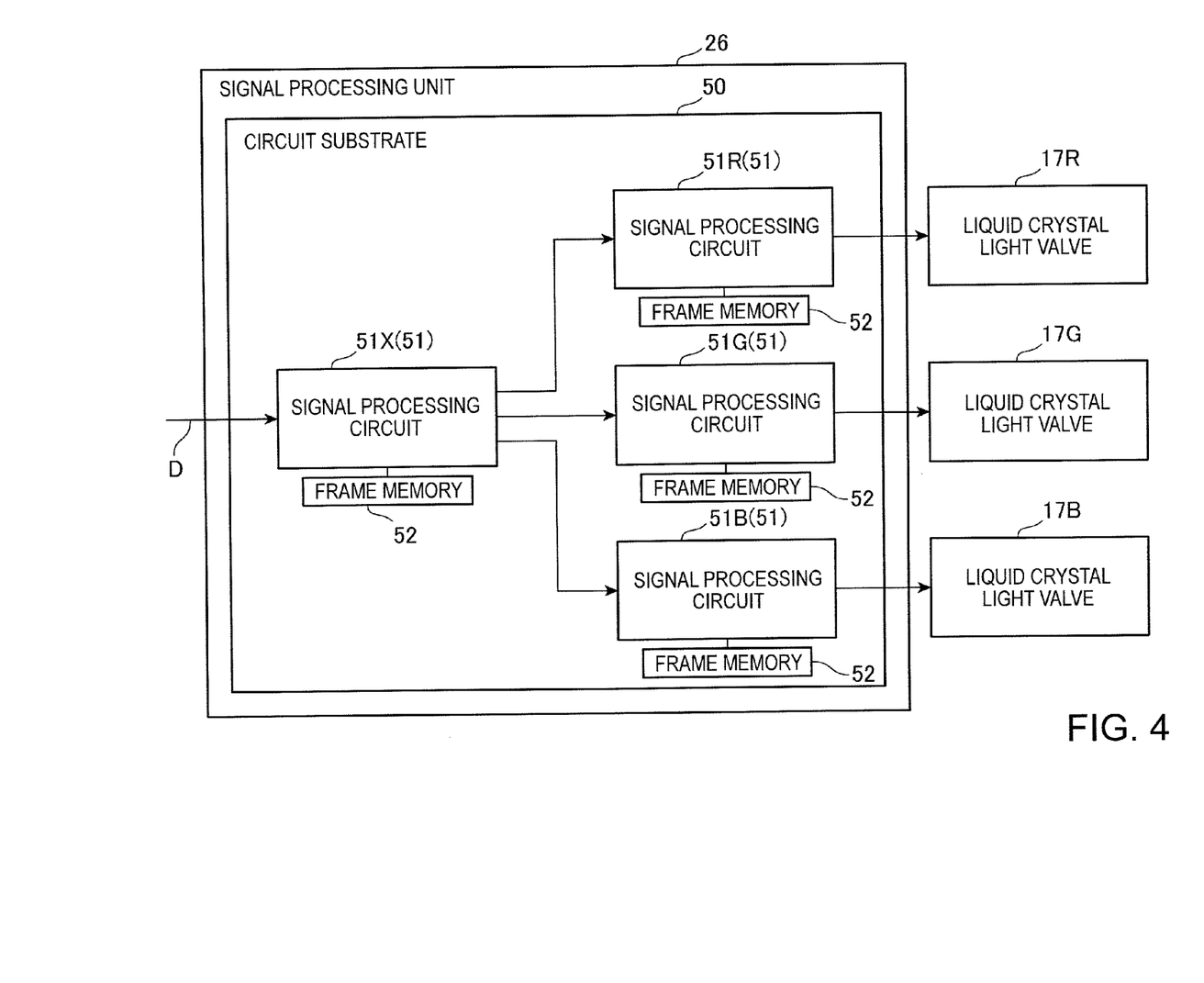
FIG. 4 is a diagram illustrating a configuration of a signal processing unit according to a higher model.

FIG. 4 is a diagram illustrating a configuration of the signal processing unit 26 according to the higher model.

As illustrated in FIG. 4, the signal processing unit 26 has a configuration in which four signal processing circuits 51 are mounted on the circuit substrate 50. Specifically, one signal processing circuit 51 into which the color video signal D is input is mounted on a front stage of the circuit substrate 50. Hereinafter, the signal processing circuit 51 that is mounted on the front stage will be appropriately designated by the reference sign "51X" and represented as "signal processing circuit 51X".

In addition, three signal processing circuits 51 are mounted on a rear stage of the circuit substrate 50 in respective correspondence with the liquid crystal light valves 17R, 17G, and 17B. Hereinafter, the signal processing circuit 51 that is disposed in correspondence with the liquid crystal light valve 17R will be appropriately designated by the reference sign "51R" and represented as "signal processing circuit 51R". Similarly, the signal processing circuit 51 that corresponds to the liquid crystal light valve 17G will be appropriately represented as "signal processing circuit 51G", and the signal processing circuit 51 that is disposed in correspondence with the liquid crystal light valve 17B will be appropriately represented as "signal processing circuit 51B".

Each of the signal processing circuits 51 mounted on the circuit substrate 50 has the same configuration as the signal processing circuit 51 included in the above signal processing unit 26 according to the lower model (refer to FIG. 3). That is, the signal processing unit 26 according to the lower model has a configuration in which the signal processing circuit 51 is mounted as a single body on the circuit substrate 50, while the signal processing unit 26 according to the higher model has a configuration in which a plurality of signal processing circuits 51 is mounted on the circuit substrate 50.

In addition, the frame memory 52 is mounted on the circuit substrate 50 in correspondence with each of the four signal processing circuits 51.

Hereinafter, basic operation of the signal processing unit 26 according to the higher model will be described by using FIG. 4.

In the signal processing unit 26 according to the higher model, the operating mode of the signal processing circuit 51X is switched to the second operating mode, while the operating mode of each of the signal processing circuits 51R, 51G, and 51B is switched to the third operating mode.

As illustrated in FIG. 4, the color video signal D is input into the signal processing circuit 51X. The signal processing circuit 51X generates the red color frame image data Pr, the green color frame image data Pg, and the blue color frame image data Pb on the basis of the input color video signal D and outputs the generated data as signals to the signal processing circuits 51R, 51G, and 51B.

The signal processing circuit 51R applies a drive voltage to the liquid crystal light valve 17R on the basis of the input red color frame image data Pr to drive the liquid crystal light valve 17R. Similarly, the signal processing circuit 51G drives the liquid crystal light valve 17G on the basis of the input green color frame image data Pg, and the signal processing circuit 51B drives the liquid crystal light valve 17B on the basis of the input blue color frame image data Pb.

Next, processing of each circuit of the signal processing circuit 51X according to the second operating mode will be described in detail, and subsequently, processing of each circuit of the signal processing circuits 51R, 51G, and 51B according to the third operating mode will be described in detail.

Description of Processing of Each Circuit of Signal Processing Circuit 51X According to Second Operating Mode As described above, the configuration of the signal processing circuit 51 of the signal processing unit 26 according to the lower model is the same as the configuration of the signal processing circuit 51X of the signal processing unit 26 according to the higher model. From this point of view, hereinafter, processing of each circuit of the signal processing circuit 51X will be described with appropriate reference to FIG. 3.

As described above, the operating mode of the signal processing circuit 51X is switched to the second operating mode, and each circuit of the signal processing circuit 51X performs various types of processing in compliance with the second operating mode.

The video signal input circuit 56 of the signal processing circuit 51X according to the second operating mode performs the same processing as the video signal input circuit 56 according to the first operating mode. That is, the video signal input circuit 56 generates the frame image data P on the basis of the input color video signal D and outputs the frame image data P to the RGB image processing circuit 57.

The RGB image processing circuit 57 of the signal processing circuit 51X according to the second operating mode performs the same processing as the RGB image processing circuit 57 according to the first operating mode. That is, the RGB image processing circuit 57 performs a predetermined type of processing on the input frame image data P and generates the red color frame image data Pr which is red color component image data corresponding to one frame, the green color frame image data Pg which is green component image data corresponding to one frame, and the blue color frame image data Pb which is blue color component image data corresponding to one frame. Then, the RGB image processing circuit 57 outputs the red color frame image data Pr, the green color frame image data Pg, and the blue color frame image data Pb respectively to the first image processing circuit 591, the second image processing circuit 592, and the third image processing circuit 593.

The first image processing circuit 591 of the signal processing circuit 51X according to the second operating mode outputs the input red color frame image data Pr to the drive signal control circuit 60 without performing image processing. Similarly, the second image processing circuit 592 and the third image processing circuit 593 of the signal processing circuit 51X according to the second operating mode output the input green color frame image data Pg and the blue color frame image data pb to the drive signal control circuit 60 without performing image processing.

As such, in the second operating mode, each of the first image processing circuit 591, the second image processing circuit 592, and the third image processing circuit 593 does not perform image processing and accordingly does not use the frame memory 52.

In addition, the liquid crystal light valves 17R, 17G, and 17B according to the higher model have high resolution, and accordingly, a circuit that performs image processing of the red color frame image data Pr, the green color frame image data Pg, and the blue color frame image data Pb is required to have a high processing capability. However, since each of the first image processing circuit 591, the second image processing circuit 592, and the third image processing circuit 593 does not perform image processing in the second operating mode, delays and the like in processing due to insufficient processing capabilities of these circuits are not generated.

The reason why the processing capabilities of the first image processing circuit 591, the second image processing circuit 592, and the third image processing circuit 593 satisfy a required processing capability in the second operating mode is also explained as follows. That is, in the first operating mode and in the third operating mode, each image processing circuit has to be operated at a drive frequency (for example, 240 fps) of the liquid crystal light valves. Meanwhile, in the second operating mode, each image processing circuit may be operated in correspondence with an input frame rate (for example, 60 fps) or an output frame rate of an intermediate frame generation circuit (for example, 120 fps).

The drive signal control circuit 60 of the signal processing circuit 51X according to the second operating mode outputs the red color frame image data Pr input from the first image processing circuit 591 to the liquid crystal light valve drive circuit 61R. Similarly, the drive signal control circuit 60 outputs the green color frame image data Pg and the blue color frame image data Pb input from the second image processing circuit 592 and the third image processing circuit 593 respectively to the liquid crystal light valve drive circuit 61G and the liquid crystal light valve drive circuit 61B.

The liquid crystal light valve drive circuit 61R of the signal processing circuit 51X according to the second operating mode is connected to the video signal input circuit 56 of the signal processing circuit 51R according to the third operating mode through a signal line (bus). The liquid crystal light valve drive circuit 61R outputs the input red color frame image data Pr as a signal to the video signal input circuit 56 of the signal processing circuit 51R.

Similarly, the liquid crystal light valve drive circuit 61G is connected to the video signal input circuit 56 of the signal processing circuit 51G through a signal line (bus). The liquid crystal light valve drive circuit 61G outputs the input green color frame image data Pg as a signal to the video signal input circuit 56 of the signal processing circuit 51G.

In addition, the liquid crystal light valve drive circuit 61B is connected to the video signal input circuit 56 of the signal processing circuit 51B through a signal line (bus). The liquid crystal light valve drive circuit 61B outputs the input blue color frame image data Pb as a signal to the video signal input circuit 56 of the signal processing circuit 51B.

Description of Processing of Each Circuit of Signal Processing Circuit 51R According to Third Operating Mode As described above, the configuration of the signal processing circuit 51 of the signal processing unit 26 according to the lower model is the same as the configuration of the signal processing circuit 51R of the signal processing unit 26 according to the higher model. From this point of view, hereinafter, processing of each circuit of the signal processing circuit 51R will be described with appropriate reference to FIG. 3.

As described above, the operating mode of the signal processing circuit 51R is switched to the third operating mode, and each circuit of the signal processing circuit 51R performs various types of processing in compliance with the third operating mode.

Hereinafter, the signal processing circuit 51R will be described, though the configurations and the operating modes of the signal processing circuit 51R, the signal processing circuit 51G, and the signal processing circuit 51B are the same and these signal processing circuits perform the same processing as the signal processing circuit 51R described below.

The video signal input circuit 56 of the signal processing circuit 51R according to the third operating mode receives input of the red color frame image data Pr from the liquid crystal light valve drive circuit 61R of the signal processing circuit 51X according to the second operating mode. The video signal input circuit 56 outputs the input red color frame image data Pr to the RGB image processing circuit 57.

The RGB image processing circuit 57 of the signal processing circuit 51R according to the third operating mode outputs the input red color frame image data Pr to the first image processing circuit 591 through the frame memory controller 58 without performing image processing of the red color frame image data Pr.

The first image processing circuit 591 of the signal processing circuit 51R according to the third operating mode collectively controls the second image processing circuit 592 to the fourth image processing circuit 594 and, in cooperation with these circuits, performs image processing of the red color frame image data Pr. That is, the first image processing circuit 591 to the fourth image processing circuit 594 distributively perform image processing of the red color frame image data Pr. For example, the first image processing circuit 591 causes itself and the second image processing circuit 592 to the fourth image processing circuit 594 to perform one type of image processing of the red color frame image data Pr in a circulating, time-division manner, and one type of processing is distributively performed by each circuit. In addition, for example, in a case where different types of processing can be parallelly performed, the first image processing circuit 591 causes one image processing circuit (for example, the second image processing circuit 592) to perform one type of processing and causes another image processing circuit (for example, the fourth image processing circuit 594) to perform another type of processing.

As described above, processing that is distributively performed by the first image processing circuit 591 to the fourth image processing circuit 594 of the signal processing circuit 51R according to the third operating mode includes types of processing that are based on characteristics and individual differences in the liquid crystal light valve 17R.

As such, since image processing of the frame image data of one certain color is distributively performed by four circuits of the first image processing circuit 591 to the fourth image processing circuit 594 in the third operating mode, the processing load of each circuit is decreased. The liquid crystal light valve 17R according to the higher model has high resolution, and accordingly, a circuit that performs image processing of the red color frame image data Pr is required to have a high processing capability. However, since the four image processing circuits perform image processing in cooperation with each other in the third operating mode, a required processing capability can be appropriately met.

Furthermore, the first image processing circuit 591 to the fourth image processing circuit 594 of the signal processing circuit 51R according to the third operating mode perform image processing of only the red color frame image data Pr without performing processing of each of the red color frame image data Pr, the green color frame image data Pg, and the blue color frame image data Pb at the same time. Thus, situations in which it is necessary to increase the bandwidth of the frame memory 52 or it is necessary to increase the capacity of the storage region of the frame memory 52 do not occur as compared with a case of performing processing of the frame image data of three colors at the same time. That is, the signal processing unit 26 according to the third mode can perform various types of processing according to the higher model with the same configuration as the signal processing unit 26 according to the first operating mode.

The first image processing circuit 591 of the signal processing circuit 51R according to the third operating mode performs a predetermined type of processing on the input red color frame image data Pr in cooperation with the second image processing circuit 592 to the fourth image processing circuit 594 and subsequently generates a drive signal related to driving of the liquid crystal light valve drive circuit 61R on the basis of the red color frame image data Pr after processing and outputs the drive signal to the drive signal control circuit 60.

The drive signal control circuit 60 of the signal processing circuit 51R according to the third operating mode applies a drive voltage to the liquid crystal light valve 17R on the basis of the input drive signal to drive the liquid crystal light valve and changes the transmittance of light in each pixel arranged in a matrix form. As a result, light that is transmitted by the liquid crystal light valve 17R is modulated in accordance with the image to be projected.

Processing of each circuit of the signal processing circuit 51R is described heretofore, though each circuit of the signal processing circuits 51G and 51B performs the same processing. That is, the signal processing circuit 51G causes the input green color frame image data Pg to be distributively processed by the four circuits of the first image processing circuit 591 to the fourth image processing circuit 594 and drives the liquid crystal light valve 17G on the basis of a processing result. In addition, the signal processing circuit 51B causes the input blue color frame image data Pb to be distributively processed by the four circuits of the first image processing circuit 591 to the fourth image processing circuit 594 and drives the liquid crystal light valve 17B on the basis of a processing result.

As described heretofore, in the present embodiment, the signal processing unit 26 according to the lower model includes one signal processing circuit 51, while the signal processing unit 26 according to the higher model includes four signal processing circuits 51. All of the signal processing circuits 51 have the same configuration. The signal processing unit 26 according to any of the models has a processing capability according to the models as described above.

Thus, it is not necessary to change the configuration of the signal processing circuit 51 according to the models. Specifically, it is not necessary for the frame memory 52 mounted on the circuit substrate 50 according to the higher model to have a higher capability than the frame memory 52 mounted on the circuit substrate 50 according to the lower model. In addition, it is not necessary for each circuit mounted on the circuit substrate 50 according to the higher model to have a higher processing capability than each circuit mounted on the circuit substrate 50 according to the lower model.

Therefore, the signal processing circuit 51 can be used in common in the projector 1 according to the higher model and in the projector 1 according to the lower model, and the manufacturing cost of these models of the projector 1 can be reduced.

As described heretofore, in the signal processing circuit 51 (signal processing circuit) according to the present embodiment, the video signal input circuit 56 and the RGB image processing circuit 57 (front stage signal processing circuit) that perform processing of an input signal and output of the signal and the first image processing circuit 591 to the third image processing circuit 593 (rear stage signal processing circuit) that perform processing which is to be performed on the signal obtained after processing of the input signal performed by the RGB image processing circuit 57 (front stage signal processing circuit) and output of the signal are disposed in the circuit substrate 50. The signal processing circuit 51 is configured to be switchable to one operating mode of the first operating mode that performs processing of a signal input into the circuit main body 54 using the stage signal processing circuit, subsequently performs processing of the signal using the rear stage signal processing circuit, and outputs the signal; the second operating mode that performs processing of a signal input into the circuit main body 54 using the front stage signal processing circuit and outputs the signal; and the third operating mode that performs processing of a signal input into the circuit main body 54 using the rear stage signal processing circuit and outputs the signal.

According to this configuration, for a processing system (signal processing unit 26 in the present embodiment) that is required to have a low processing capability, the required processing capability can be met by disposing one signal processing circuit 51 and switching the state of the one signal processing circuit 51 to the first operating mode. For a processing system that is required to have a high processing capability, the required processing capability can be met by disposing the signal processing circuit 51 for the second operating mode in the front stage and disposing the signal processing circuit 51 for the third operating mode in the rear stage to perform distributed processing using the plurality of signal processing circuits 51. In either case, both of the processing performed by the front stage signal processing circuit and the processing performed by the rear stage signal processing circuit are performed. The configuration of the signal processing circuit 51 is the same in a case of using the signal processing circuit 51 as a single body in the processing system and in a case of using the plurality of signal processing circuits 51 in the processing system. Thus, in building of the processing system, it is not necessary to use a signal processing circuit having a different processing capability, that is, a different configuration, according to a required processing capability, and cost can be reduced.

The RGB image processing circuit 57 (front stage signal processing circuit) and the first image processing circuit 591 to the fourth image processing circuit 594 (rear stage signal processing circuit) are connected to the frame memory 52 (memory). Data that is based on a signal output by the RGB image processing circuit 57 is temporarily stored in the frame memory 52, and a signal that is based on the data temporarily stored in the frame memory 52 is input into at least one circuit of the first image processing circuit 591 to the fourth image processing circuit 594 (rear stage signal processing circuit).

According to this configuration, it is possible to choose whether to build a processing system using the signal processing circuit 51 as a single body or to build a processing system using the signal processing circuit 51 in plural quantities on the basis of a relationship between a required processing capability and a capability such as a bandwidth of the frame memory 52.

In the present embodiment, the first image processing circuit 591 to the third image processing circuit 593 are disposed in plural quantities for each color as the rear stage signal processing circuit. The first image processing circuit 591 to the third image processing circuit 593 receive input of video signals for each color and perform processing on the basis of the input video signals of corresponding colors.

According to this configuration, for an apparatus that performs processing based on the input color video signal D, a processing system can be built by using one signal processing circuit 51 in a case where a low processing capability is required, or a processing system can be built by using the signal processing circuit 51 in plural quantities in a case where a high processing capability is required. That is, it is possible to build a processing system that meets a processing capability along with reducing cost.

The above embodiment is merely an illustration of one aspect of the invention, and arbitrary modifications and applications can be carried out thereto within the scope of the invention.

While the invention is illustratively applied to a signal processing circuit related to a projector in the above embodiment, the invention can be widely applied to not only a signal processing circuit used in a projector but also a circuit that performs processing of an input signal. An apparatus on which the signal processing circuit according to the invention is mounted is not limited to a projector. While the projector is illustratively described as having a configuration in which the liquid crystal light valves 17R, 17G, and 17B that correspond to each color of RGB are used as means for modulating light emitted by the light source of the light source unit 10, the invention is not limited thereto. For example, the projector may use reflection type liquid crystal panels or may be configured in a manner using three digital mirror devices (DMD) that correspond to each color of RGB or such a manner. The projector may be a rear surface projection type projector that projects image light from the rear surface side of the screen SC.

Each functional unit of the projector 1 illustrated in FIG. 1 illustrates functional configurations realized by cooperation of hardware and software, and specific forms of mounting thereof are not particularly limited. Besides, specific detailed configurations of each unit of the projector 1 can be arbitrarily changed to the extent not departing from the gist of the invention.

What is claimed is:

1. A signal processing circuit comprising:
   a front stage signal processing circuit that performs processing of input data and outputs the data; and
   a rear stage signal processing circuit that performs processing which is to be performed on the data obtained after processing of the input data performed by the front stage signal processing circuit and outputs the data,
   wherein the signal processing circuit is configured to be switchable to one state of
   a first state that performs processing of the input data using the front stage signal processing circuit, subsequently performs processing of the data using the rear stage signal processing circuit, and outputs the data,
   a second state that performs processing of the input data using the front stage signal processing circuit and outputs the data, and
   a third state that performs processing of the input data using the rear stage signal processing circuit and outputs the data,
   the front stage signal processing circuit performs processing that uses information as to a plurality of colors on the basis of input color video data and outputs video data for each color,
   the rear stage signal processing circuit is disposed in plural quantities for each color, and
   each of the rear stage signal processing circuits disposed for each color receives input of the video data for each color and performs processing on the basis of the input video data of corresponding colors in the first state.

2. The signal processing circuit according to claim 1,
   wherein the front stage signal processing circuit and the rear stage signal processing circuit are connected to a memory, and
   the data output by the front stage signal processing circuit is temporarily stored in the memory, and the data that is temporarily stored in the memory is input into the rear stage signal processing circuit.

3. The signal processing circuit according to claim 1,
   wherein a plurality of the rear stage signal processing circuits performs processing based on the video data of one color in cooperation with each other in the third state.

4. The signal processing circuit according to claim 3, further comprising:
   another rear stage signal processing circuit in addition to the rear stage signal processing circuits for each color,
   wherein each of the rear stage signal processing circuits disposed for each color performs processing on the basis of the input video data of corresponding colors, while the other rear stage signal processing circuit does not perform processing, in the first state, and
   a plurality of the rear stage signal processing circuits including the other rear stage signal processing circuit performs processing based on the video data of one color in cooperation with each other in the third state.

5. The signal processing circuit according to claim 2,
   wherein a plurality of the rear stage signal processing circuits performs processing based on the video data of one color in cooperation with each other in the third state.

6. The signal processing circuit according to claim 5, further comprising:
   another rear stage signal processing circuit in addition to the rear stage signal processing circuits for each color,
   wherein each of the rear stage signal processing circuits disposed for each color performs processing on the basis of the input video data of corresponding colors, while the other rear stage signal processing circuit does not perform processing, in the first state, and
   a plurality of the rear stage signal processing circuits including the other rear stage signal processing circuit performs processing based on the video data of one color in cooperation with each other in the third state.

7. A circuit substrate on which mounted is
a signal processing circuit in which a front stage signal processing circuit that performs processing of input data and outputs the data and a rear stage signal processing circuit that performs processing which is to be performed on the data obtained after processing of the input data performed by the front stage signal processing circuit and outputs the data are disposed, and that is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data, and a third state that performs processing of the input data using the rear stage signal processing circuit and outputs the data,
wherein a state of the signal processing circuit mounted is switched to the first state in a case where the signal processing circuit is mounted as a single body,
a state of the signal processing circuit mounted on a front stage is switched to the second state and a state of the signal processing circuit mounted on a rear stage is switched to the third state in a case where a plurality of the signal processing circuits is mounted in combination,
the front stage signal processing circuit of the signal processing circuit performs processing that uses information as to a plurality of colors on the basis of input color video data and outputs video data for each color,
the rear stage signal processing circuit of the signal processing circuit is disposed in plural quantities for each color, and
in a case where the signal processing circuit is mounted as a single body and the state of the signal processing circuit mounted is switched to the first state, each of the rear stage signal processing circuits of the signal processing circuit disposed for each color receives input of the video data for each color and performs processing on the basis of the input video data of corresponding colors.

8. The circuit substrate according to claim 7,
wherein the front stage signal processing circuit and the rear stage signal processing circuit of the signal processing circuit are connected to a memory, the data output by the front stage signal processing circuit is temporarily stored in the memory, and the data that is temporarily stored in the memory is input into the rear stage signal processing circuit.

9. The circuit substrate according to claim 7,
wherein in a case where a plurality of the signal processing circuits is mounted in combination, a plurality of the signal processing circuits is mounted for each color on the rear stage, the state of the signal processing circuit mounted on the front stage is switched to the second state, and the state of each of the signal processing circuits mounted on the rear stage is switched to the third state,
the signal processing circuit in the front stage according to the second state outputs the video data for each color to the corresponding signal processing circuits in the rear stage on the basis of the input color video data, and
in each of the signal processing circuits in the rear stage according to the third state, a plurality of the rear stage signal processing circuits performs processing based on the input video data of one color in cooperation with each other.

10. The circuit substrate according to claim 9,
wherein the signal processing circuit includes another rear stage signal processing circuit in addition to the rear stage signal processing circuits for each color,
each of the rear stage signal processing circuits disposed for each color performs processing on the basis of the input video data of corresponding colors, while the other signal processing circuit does not perform processing, in the first state, and
a plurality of the rear stage signal processing circuits including the other rear stage signal processing circuit performs processing based on the video data of one color in cooperation with each other in the third state.

11. The circuit substrate according to claim 8,
wherein in a case where a plurality of the signal processing circuits is mounted in combination, a plurality of the signal processing circuits is mounted for each color on the rear stage, the state of the signal processing circuit mounted on the front stage is switched to the second state, and the state of each of the signal processing circuits mounted on the rear stage is switched to the third state,
the signal processing circuit in the front stage according to the second state outputs the video data for each color to the corresponding signal processing circuits in the rear stage on the basis of the input color video data, and
in each of the signal processing circuits in the rear stage according to the third state, a plurality of the rear stage signal processing circuits performs processing based on the input video data of one color in cooperation with each other.

12. The circuit substrate according to claim 11,
wherein the signal processing circuit includes another rear stage signal processing circuit in addition to the rear stage signal processing circuits for each color,
each of the rear stage signal processing circuits disposed for each color performs processing on the basis of the input video data of corresponding colors, while the other signal processing circuit does not perform processing, in the first state, and
a plurality of the rear stage signal processing circuits including the other rear stage signal processing circuit performs processing based on the video data of one color in cooperation with each other in the third state.

13. A projector comprising:
light modulation units for each color;
a projection unit that projects light modulated by the light modulation units for each color; and
a circuit substrate on which mounted is
a signal processing circuit in which a front stage signal processing circuit that performs processing which uses information as to a plurality of colors on the basis of input color video data and outputs video data for each color is disposed and a rear stage signal processing circuit that performs processing on the basis of input video data of a corresponding color is disposed in plural quantities for each color, and that is configured to be switchable to one state of a first state that performs processing of the input data using the front stage signal processing circuit, subsequently performs processing of the data using the rear stage signal processing circuit, and outputs the data, a second state that performs processing of the input data using the front stage signal processing circuit and outputs the data, and a third state that performs processing of the input data using the rear stage signal processing circuit and outputs the data, wherein in a case where the signal processing circuit is mounted as a single body, a state of the signal processing circuit mounted is switched to the first state, and in a case where a plurality of the signal processing circuits is mounted in combination, a state of the signal processing circuit mounted on a front stage is switched to the second state and a state of the signal processing circuit mounted on a rear stage is switched to the third state.

14. The projector according to claim 13, wherein the front stage signal processing circuit and the rear stage signal processing circuit are connected to a memory, and the data output by the front stage signal processing circuit is temporarily stored in the memory, and the data that is temporarily stored in the memory is input into the rear stage signal processing circuit.

15. The projector according to claim 13, wherein a plurality of the rear stage signal processing circuits performs processing based on the video data of one color in cooperation with each other in the third state.

16. The projector according to claim 15, further comprising:

another rear stage signal processing circuit in addition to the rear stage signal processing circuits for each color, wherein each of the rear stage signal processing circuits disposed for each color performs processing on the basis of the input video data of corresponding colors, while the other rear stage signal processing circuit does not perform processing, in the first state, and a plurality of the rear stage signal processing circuits including the other rear stage signal processing circuit performs processing based on the video data of one color in cooperation with each other in the third state.

17. The projector according to claim 14, wherein a plurality of the rear stage signal processing circuits performs processing based on the video data of one color in cooperation with each other in the third state.

18. The projector according to claim 17, further comprising:

another rear stage signal processing circuit in addition to the rear stage signal processing circuits for each color, wherein each of the rear stage signal processing circuits disposed for each color performs processing on the basis of the input video data of corresponding colors, while the other rear stage signal processing circuit does not perform processing, in the first state, and a plurality of the rear stage signal processing circuits including the other rear stage signal processing circuit performs processing based on the video data of one color in cooperation with each other in the third state.

* * * * *